(12) United States Patent
Nakazima et al.

(10) Patent No.: US 11,205,988 B2
(45) Date of Patent: Dec. 21, 2021

(54) MOTOR CONTROL DEVICE

(71) Applicant: DENSO CORPORATION, Kariya (JP)

(72) Inventors: Nobuyori Nakazima, Kariya (JP); Go Endoh, Kariya (JP); Kouichi Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/001,588

(22) Filed: Aug. 24, 2020

(65) Prior Publication Data

US 2021/0067081 A1 Mar. 4, 2021

(30) Foreign Application Priority Data

Aug. 26, 2019 (JP) .............................. JP2019-153714

(51) Int. Cl.
*H02P 27/06* (2006.01)
*H02P 29/024* (2016.01)
*B62D 5/04* (2006.01)

(52) U.S. Cl.
CPC ............ *H02P 29/027* (2013.01); *B62D 5/046* (2013.01); *B62D 5/0487* (2013.01); *H02P 27/06* (2013.01)

(58) Field of Classification Search
CPC ....... B62D 5/046; B62D 5/0487; H02P 27/06; H02P 29/027
See application file for complete search history.

(56) References Cited

U.S. PATENT DOCUMENTS

| | | | | |
|---|---|---|---|---|
| 9,154,064 | B2* | 10/2015 | Suzuki | H02P 29/027 |
| 2010/0259207 | A1* | 10/2010 | Kitanaka | H02P 21/22 |
| | | | | 318/400.17 |
| 2011/0080126 | A1* | 4/2011 | Yabuguchi | H02P 21/0003 |
| | | | | 318/400.21 |
| 2012/0074885 | A1* | 3/2012 | Hirono | H02M 1/32 |
| | | | | 318/400.22 |
| 2016/0181954 | A1 | 6/2016 | Satou et al. | |
| 2018/0257701 | A1* | 9/2018 | Tsuchimoto | B62D 5/0484 |
| 2018/0287538 | A1 | 10/2018 | Nakashima et al. | |

* cited by examiner

*Primary Examiner* — Thai T Dinh
(74) *Attorney, Agent, or Firm* — Maschoff Brennan

(57) ABSTRACT

A motor control device includes at least one power converter. The at least one power converter is connected between a DC power supply and a motor. The at least one power converter converts a DC electric power into a multi-phase AC electric power by operating a plurality of switching elements and supplies the multi-phase AC electric power to the motor. The motor control device calculates a command value for operating the at least one power converter to control electrical conduction to the motor. The motor control device determines an overcurrent fault when a value of a current flowing through the at least one power converter or a motor winding of the motor exceeds an overcurrent threshold value. The motor control device estimates or detects a power supply current that is a direct current flowing between the DC power supply and the at least one power converter.

6 Claims, 10 Drawing Sheets

MOTOR CONTROL DEVICE

CROSS REFERENCE TO RELATED APPLICATION

This application is based on Japanese Patent Application No. 2019-153714 filed on Aug. 26, 2019, the disclosure of which is incorporated herein by reference.

TECHNICAL FIELD

The present disclosure relates to a motor control device.

BACKGROUND

In a motor control device that determines an overcurrent fault of a power converter or a motor winding, a technique in which erroneous determination of the overcurrent fault due to a current resulting from regenerative energy in a normal state is avoided has been proposed.

For example, a motor control device stops the overcurrent fault determination when determining that an input voltage of the power converter is outside an operating range during normal operation.

SUMMARY

The present disclosure provides a motor control device that includes at least one power converter. The at least one power converter is connected between a DC power supply and a motor. The at least one power converter converts a DC electric power into a multi-phase AC electric power by operating a plurality of switching elements and supplies the multi-phase AC electric power to the motor. The motor control device calculates a command value for operating the at least one power converter to control electrical conduction to the motor. The motor control device determines an overcurrent fault when a value of a current flowing through the at least one power converter or a motor winding of the motor exceeds an overcurrent threshold value. The motor control device estimates or detects a power supply current that is a direct current flowing between the DC power supply and the at least one power converter.

BRIEF DESCRIPTION OF DRAWINGS

The features and advantages of the present disclosure will become more apparent from the following detailed description made with reference to the accompanying drawings. In the drawings.

DETAILED DESCRIPTION

For example, when power supply voltage is low, an increase in input voltage when regenerative energy is generated is small. Thus, erroneous determination of overcurrent fault may be difficult to be performed only by based on the input voltage. In a case of a motor control device applied to a vehicle, an operation in a low voltage state is required in order to deal with automatic driving. Thus, the concern will be magnified.

The present disclosure provides a motor control device that avoids erroneous determination of overcurrent fault due to regenerative current.

An exemplary embodiment of the present disclosure provides a motor control device that includes at least one power converter and a processor. The at least one power converter is connected between a DC power supply and a motor. The at least one power converter is configured to convert a DC electric power into a multi-phase AC electric power by operating a plurality of switching elements and supply the multi-phase AC electric power to the motor. The processor is configured to calculate a command value for operating the at least one power converter to control electrical conduction to the motor. The processor is configured to determine an overcurrent fault when a value of a current flowing through the at least one power converter or a motor winding of the motor exceeds an overcurrent threshold value. The processor is configured to estimate or detect a power supply current that is a direct current flowing between the DC power supply and the at least one power converter. A value of the power supply current supplied from the DC power supply to the at least one power converter is defined by a positive value, and a value of the power supply current regenerated from the at least one power converter to the DC power supply is defined by a negative value. When the negative value of the power supply current is smaller than a power supply current threshold value as a negative value, the processor stops determination of the overcurrent fault.

Here, "the value of the power supply current is smaller than the negative power supply current threshold value" means "the negative value of the power supply current is larger than the negative power supply current threshold value on the negative side", that is, "an absolute value of the negative power supply current is greater than an absolute value of the negative power supply current threshold value".

In the exemplary embodiment of the present disclosure, when the power supply voltage is low and an increase in input voltage when regenerative energy is generated is small, erroneous determination of the overcurrent fault can be avoided.

Another exemplary embodiment of the present disclosure provides a motor control device includes at least one power converter and a processor. The at least one power converter is connected between a DC power supply and a motor. The at least one power converter is configured to convert a DC electric power into a multi-phase AC electric power by operating a plurality of switching elements and supply the multi-phase AC electric power to the motor. The processor is configured to calculate a command value for operating the at least one power converter to control electrical conduction to the motor. The processor is configured to determine an overcurrent fault when a value of a current flowing through the at least one power converter or a motor winding of the motor exceeds an overcurrent threshold value. The processor is configured to estimate or detect a power supply current that is a direct current flowing between the DC power supply and the at least one power converter. A value of the power supply current supplied from the DC power supply to the at least one power converter is defined by a positive value, and a value of the power supply current regenerated from the at least one power converter to the DC power supply is defined by a negative value. When the value of the power supply current is smaller than a power supply current threshold value as a negative value, the processor performs a command value lowering process that lowers an absolute value of the command value. When the command value lowering process is performed, the processor stops determination of the overcurrent fault.

In another exemplary embodiment of the present disclosure, when the value of the power supply current is smaller than the negative power supply current threshold value, the motor control device causes the absolute value of the command value to be reduced to suppress the overvoltage and stops the determination of the overcurrent fault. Therefore, it is possible to more reliably avoid the erroneous determination of the overcurrent fault under a condition that the overcurrent fault is unlikely to occur.

An "embodiment" means an embodiment of the present application. A motor control device will be described with reference to plural embodiments shown in the accompanying drawings. This motor control device is used as a control device for driving a steering assist motor in an electric power steering device of a vehicle. In the following embodiments, substantially same structural parts are designated with the same reference numerals thereby to simplify the description. The following first to third embodiments are collectively referred to as a "present embodiment".

Electric Power Steering Device

Figure 1:
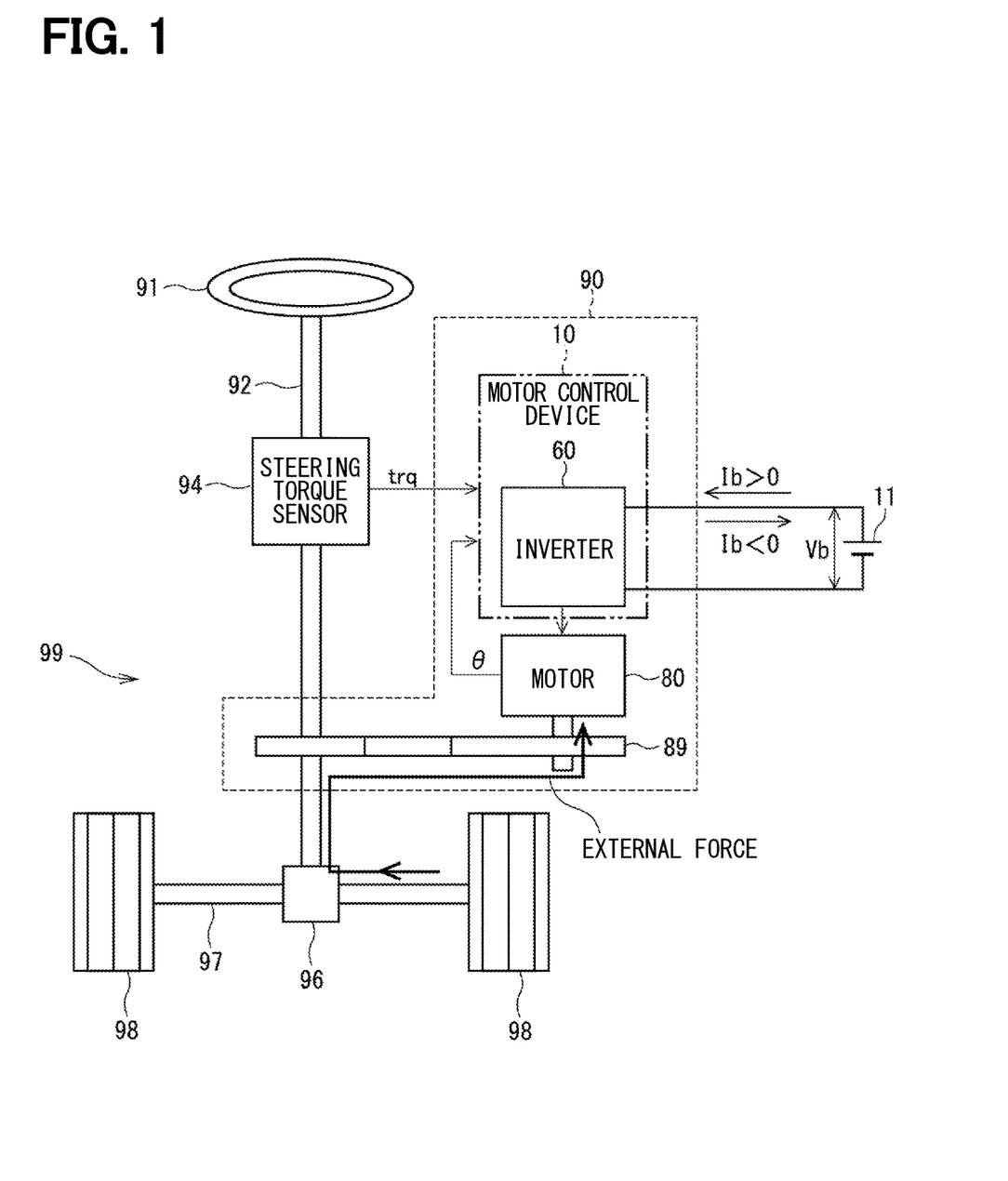
FIG. 1 is an overall configuration diagram showing an electric power steering device to which a motor control device of each embodiment is applied.

FIG. 1 shows an overall configuration of a steering system 99 including an electric power steering device 90. Although the electric power steering device 90 shown in FIG. 1 is column assist type, a motor control device 10 may be applied to an electric power steering device of rack assist type. The steering system 99 includes a steering wheel 91, a steering shaft 92, a pinion gear 96, a rack shaft 97, road wheels 98, the electric power steering device 90 and the like. The steering shaft 92 is connected to the steering wheel 91.

The pinion gear 96 provided at an end of the steering shaft 92 engages with the rack shaft 97. A pair of wheels 98 are provided at both ends of the rack shaft 97 via, for example, tie rods. When the driver rotates the steering wheel 91, the steering shaft 92 connected to the steering wheel 91 rotates. A rotational motion of the steering shaft 92 is converted into a linear motion of the rack shaft 97 by the pinion gear 96, and the pair of wheels 98 are steered at an angle corresponding to a displacement amount of the rack shaft 97.

The electric power steering device 90 includes a steering torque sensor 94, a motor control device 10, a motor 80, a reduction gear 89 and the like. The steering torque sensor 94 is provided at an intermediate portion of the steering shaft 92 to detect a steering torque trq applied by the driver. The motor control device 10 acquires information such as steering torque trq, steering speed, and vehicle speed from an outside, and controls the drive of the motor 80 so that the motor 80 outputs an intended assist torque calculated from the information. The assist torque generated by the motor 80 is transmitted to the steering shaft 92 via the reduction gear 89.

The motor control device 10 includes an inverter 60 as a "power converter". The inverter 60 converts the DC power from the battery 11 as a "DC power supply" into the multi-phase AC power and supplies the power to the motor 80. Hereinafter, the power supply voltage of the battery 11 will be referred to as Vb. Further, the direct current flowing between the battery 11 and the inverter 60 will be referred to as "power supply current Ib". The value of the power supply current Ib is defined as positive when the power supply current Ib is supplied from the battery 11 to the inverter 60 and negative when the power supply current Ib is regenerated from the inverter 60 to the battery 11.

For example, when the wheels run on the curb while the vehicle is traveling, the wheels 98 are steered steeply, and the external force is reversely input to the output shaft of the motor 80 via the rack shaft 97. At this time, a regenerative current is generated in the motor 80 by the regenerative energy. In addition, the motor 80 may generate a back electromotive force when the steering wheel 91 is operated in a no-load state in which the wheels 98 are jacked up. Further, when there is a difference in the output of each system in the dual-system motor having two sets of motor windings, one of the motor windings may perform a powering operation and the other may perform a regenerative operation.

In the present embodiment, attention is paid to switching of permission or cancellation of the overcurrent fault determination when such a regenerative current is generated. Hereinafter, the configuration and operational effects of the motor control device of each embodiment will be described. Further, a unit of a group of components related to electrical conduction to the motor winding is defined as a "system". The first and second embodiments will describe a single-system motor control device, and the third embodiment will describe a dual-system motor control device as a representative of a plurality of systems.

First Embodiment

Figure 2:
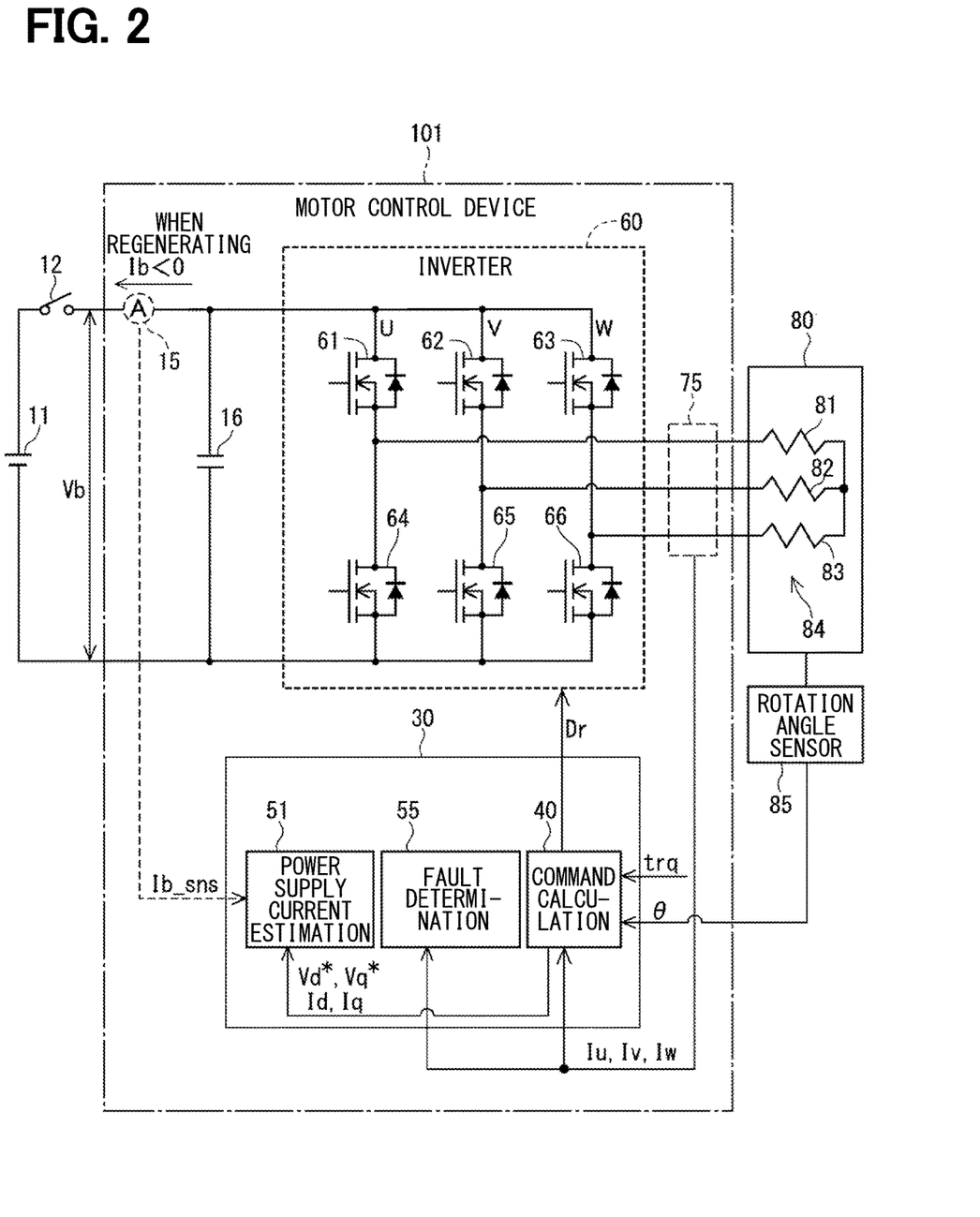
FIG. 2 is an overall configuration diagram showing a single-system motor control device according to first and second embodiments.

A motor control device 101 according to a first embodiment will be described with reference to FIGS. 2 to 5. As shown in FIG. 2, the motor 80 is a three-phase brushless motor having a three-phase motor winding 84 including a U-phase winding 81, a V-phase winding 82, and a W-phase winding 83. The current sensor 75 detects the phase currents Iu, Iv, Iw flowing through the inverter 60 or the motor winding 84. The rotation angle sensor 85 detects an electrical angle θ of the motor 80.

The motor control device 101 includes an inverter 60, a microcomputer 30, the current sensor 75 and the like. The inverter 60 converts the DC power of the battery 11 into a three-phase AC power and energizes the motor winding 84 by the operation of six bridge-connected switching elements 61 to 66. The switching elements 61 to 66 may be provided by MOSFETs. The switching elements 61, 62 and 63 are upper-arm switching elements of the U-phase, V-phase and W-phase of the first inverter 60, respectively. The switching elements 64, 65 and 66 are lower-arm switching elements of the U-phase, V-phase and W-phase of the first inverter 60, respectively.

A power supply relay 12 is provided between the battery 11 and the inverter 60, and a smoothing capacitor 16 is provided at the input part of the inverter 60. Further, as shown by a broken line, a power supply current sensor 15 that detects the power supply current Ib may be provided.

The microcomputer 30 includes a CPU, a ROM, a RAM, an I/O (not shown), a bus line for connecting those components, and the like. The motor control device 101 executes software processing by executing a program stored in advance by the CPU, and control by hardware processing by a dedicated electronic circuit. The microcomputer 30 of the first embodiment includes a command calculation unit 40, a power supply current estimation unit 51, a fault determination unit 55 and the like.

The command calculation unit 40 operates the inverter 60 by the drive signal Dr to calculate a command value for controlling the electrical conduction to the motor 80. The fault determination unit 55 determines that there is an overcurrent fault when the phase currents Iu, Iv, Iw flowing through the inverter 60 or the motor winding 84 exceed the overcurrent threshold value. The power supply current estimation unit 51 estimates or detects the power supply current Ib.

Figure 3:
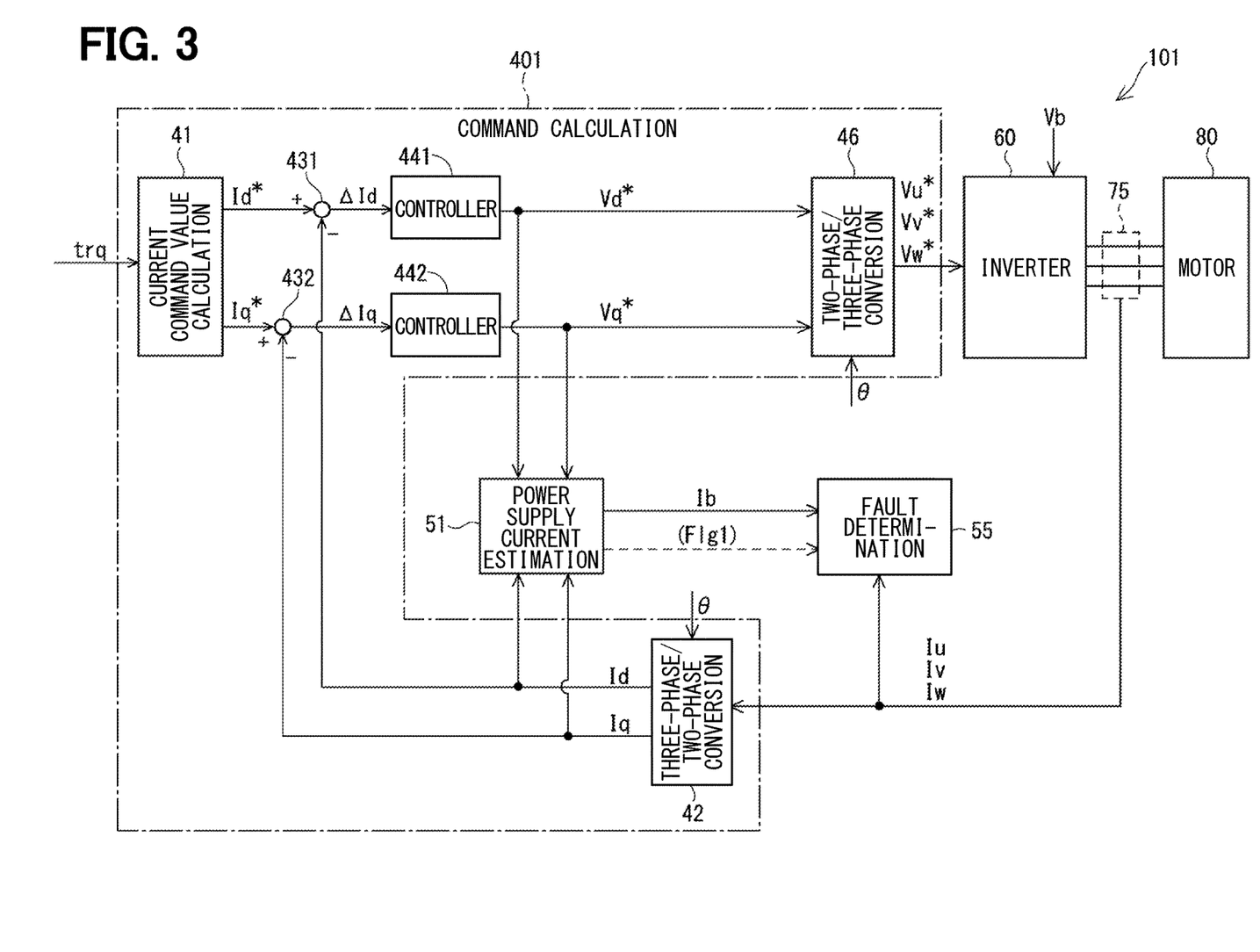
FIG. 3 is a block diagram for control according to the first embodiment.

Subsequently, a detailed control configuration of the motor control device 101 will be described with reference to FIG. 3. In FIG. 3, the voltages Vu, Vv, Vw and the currents Iu, Iv, Iw of the three phases are collectively represented by one line. Regarding the electrical angle θ for coordinate conversion calculation, the signal line from the rotation angle sensor 85 is omitted and the input arrow is shown.

A command calculation unit 401 includes a current command value calculation unit 41, a three-phase/two-phase conversion unit 42, current deviation calculation units 431, 432, controllers 441, 442, and a two-phase/three-phase conversion unit 46 as a configuration of current feedback control by vector control. The current command value calculation unit 41 calculates dq axis current command values Id*, Iq* based on the steering torque trq and the like. The three-phase/two-phase conversion unit 42 converts the phase currents Iu, Iv, Iw into two phases by using the electrical angle θ, and feeds back the real currents Id, Iq on the dq axes.

The current deviation calculation unit 431 calculates a current deviation ΔId between the d-axis current command value Id* and the d-axis current Id. The current deviation calculation unit 432 calculates the current deviation ΔIq between the q-axis current command value Iq* and the q-axis current Iq. The d-axis current controller 441 calculates the d-axis voltage command value Vd* by PI control so that the current deviation ΔId approaches 0. The q-axis current controller 442 calculates the q-axis voltage command value Vq* by PI control so that the current deviation ΔIq approaches 0.

The two-phase/three-phase conversion unit 46 converts the dq-axis voltage command values Vd*, Vq* into the three-phase voltage command values Vu*, Vv*, Vw* by using the electrical angle θ. The drive signal Dr based on the three-phase voltage command values Vu*, Vv*, Vw* is output to the inverter 60. The inverter 60 converts the DC power of the battery 11 into the three-phase AC power by operating the plurality of switching elements 61 to 66 based on the drive signal Dr, and supplies the three-phase AC power to the motor 80.

The fault determination unit 55 determines that there is an overcurrent fault when the phase currents Iu, Iv, Iw flowing through the inverter 60 or the motor windings 81, 82, 83 of the motor 80 exceed the overcurrent threshold value. Specifically, the fault determination unit 55 determines that there is an overcurrent fault when the phase currents Iu, Iv, Iw that change positively and negatively in sinusoidal waves exceed a positive current threshold value or a negative current threshold value, or the absolute value of each of the phase currents Iu, Iv, Iw exceeds a current threshold value.

During a normal operation, the fault determination unit 55 determines that there is an overcurrent fault when a short-circuit fault of the switching elements 61 to 66 of the inverter 60 occurs or a power fault or a ground fault of the motor windings 81, 82, 83 occurs. At this time, fail safe is realized by stopping the drive of the inverter 60 or cutting off the power supply relay 12. For example, a measure at the time of fault is taken such as notifying the vehicle ECU of fault information via the in-vehicle LAN and giving a warning to the driver.

However, when the phase currents Iu, Iv, Iw are temporarily increased by the back electromotive force generated by the reverse input of the external force, the fault determination unit 55 may determine that there is an overcurrent fault although it is not the short circuit failure of the element or the current path. As a result, inconvenience occurs, such as, the drive of the inverter 60 is stopped and the steering assist function is lost. In addition, the warning may cause excessive anxiety to the driver.

For example, the power supply voltage Vb may be low and the increase in the input voltage when the regenerative energy is generated may be small. In this case, the configuration in which the current fault determination is stopped when it is determined that the input voltage of the inverter 60 exceeds the normal operation range may erroneously determine that there is an overcurrent fault without stopping the overcurrent fault determination when the normal regenerative current occurs. The operation in a low voltage state is required to deal with automatic driving, so the concern will be magnified.

In the present embodiment, it is determined whether a normal regenerative current is generated based on a parameter other than the input voltage. The present disclosure appropriately avoids erroneous determination of overcurrent fault even when the power supply voltage Vb is low and the increase in input voltage when regenerative energy is generated is small. The motor control device 101 includes the power supply current estimation unit 51 that estimates or detects the power supply current Ib. The power supply current Ib to which attention is paid in this embodiment is a regenerative current flowing from the inverter 60 toward the battery 11, that is, a negative power supply current Ib.

FIG. 3 shows a configuration in which the power supply current estimation unit 51 estimates the power supply current Ib based on the dq axis voltage command values Vq*, Vd*, the dq axis currents Iq, Id, and the reference voltage Vref. The estimated value Ib_est of the power supply current is calculated by the equation (1). The reference voltage Vref is a constant that does not depend on the actual inverter input voltage, and for example, 12[V].

$$Ib\_est = (Vd^* \times Id + Vq^* \times Iq)/Vref \tag{1}$$

Alternatively, the power supply current estimation unit 51 may acquire a detection value Ib_sns of the power supply current detected by the power supply current sensor 15 shown by the broken line in FIG. 2. In the present specification, it is described that "the power supply current estimating unit 51 detects the power supply current Ib" including that the power supply current estimating unit 51 acquires the power supply current Ib detected by the power supply current sensor 15.

Figure 4:
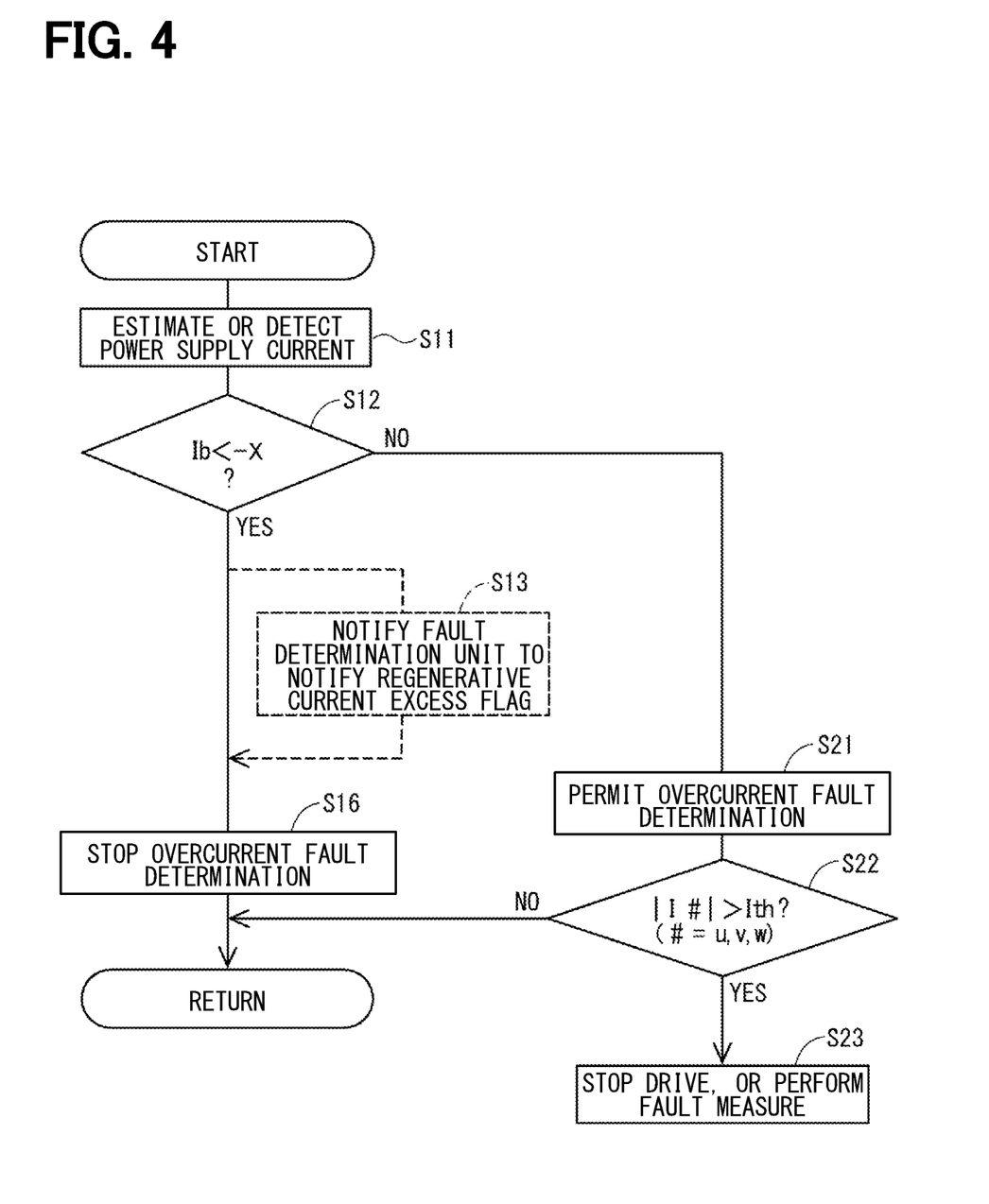
FIG. 4 is a flowchart showing overcurrent fault determination mask processing according to the first embodiment.
Figure 5:
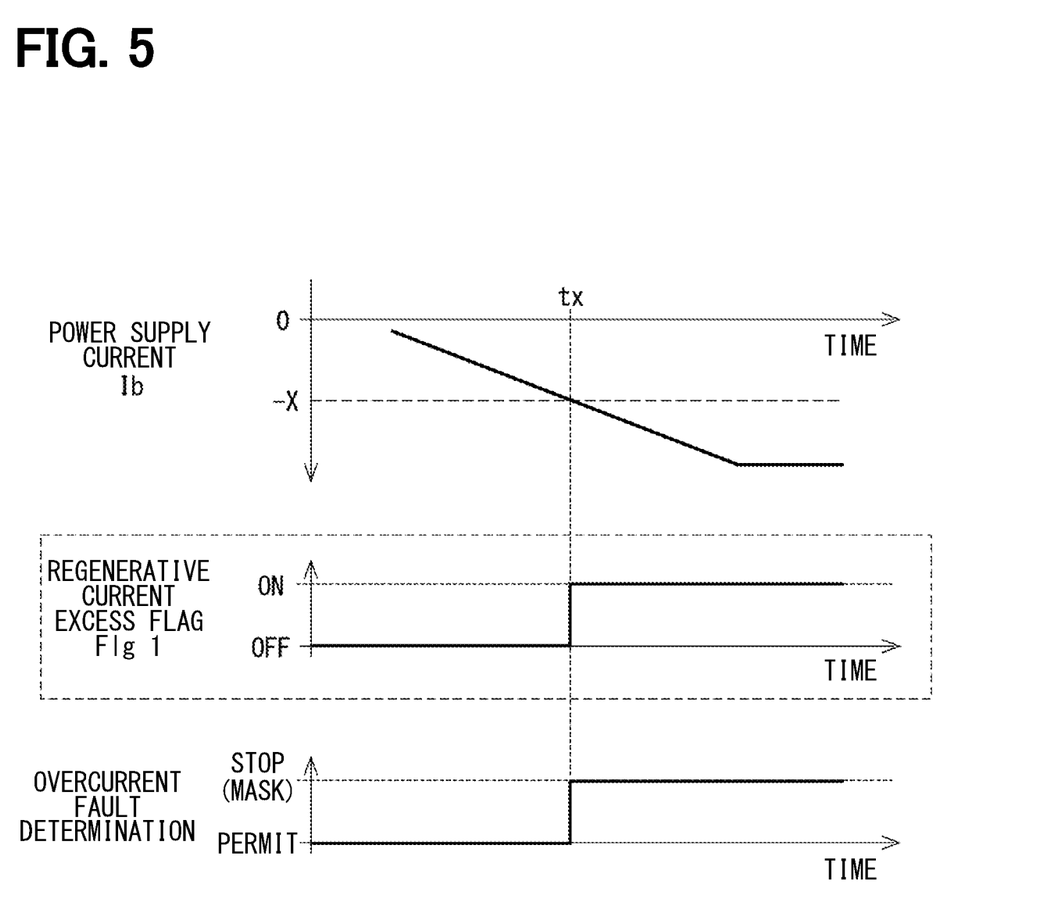
FIG. 5 is a time chart showing the overcurrent fault determination mask processing according to the first embodiment.

The value of the power supply current Ib estimated or detected by the power supply current estimation unit 51 is compared with a negative power supply current threshold value (−X) shown in FIGS. 4 and 5. Here, the power supply current estimation unit 51 may notify the power supply current Ib to the fault determination unit 55, and the fault determination unit 55 may compare the value of the power supply current Ib with the threshold value (−X). In this case, the fault determination unit 55 stops the overcurrent fault determination when "Ib<(−X)" is satisfied. Hereinafter, "stopping the overcurrent fault determination" may be rephrased as "masking the overcurrent fault determination". Further, this processing according to the present embodiment is referred to as "overcurrent fault determination mask processing".

Alternatively, the power supply current estimation unit 51 compares the value of the power supply current Ib with the threshold value (−X), and when "Ib<(−X)" is satisfied, the power supply current estimation unit 51 notifies the fault determination unit 55 of a regenerative current excess flag Flg1. The fault determination unit 55 that receives the regenerative current excess flag Flg1 stops the overcurrent fault determination.

A specific example of the overcurrent fault determination mask processing according to the first embodiment will be described with reference to the flowchart of FIG. 4 and the time chart of FIG. 5. This processing is repeatedly executed during the operation of the motor control device 101. In FIG. 5, the time difference due to the communication delay is ignored.

At S11, the power supply current estimation unit 51 estimates or detects the power supply current Ib. At S12, it is determined whether the value of the power supply current Ib is smaller than the negative power supply current threshold value (−X). In the case of YES at S12, the fault determination unit 55 stops the overcurrent fault determination at S16. In the case of NO at S12, the fault determination unit 55 permits the overcurrent fault determination at S21.

In FIG. 5, before the time tx, the value of the power supply current Ib is equal to or greater than the threshold value (−X), and thus the overcurrent fault determination is permitted. After the time tx, the power supply current Ib is less than the threshold value (−X), and thus the overcurrent fault determination is masked.

Here, the determination at S12 may be made by the fault determination unit 55 or the power supply current estimation unit 51. When the fault determination unit 55 makes the determination at S12, the processing directly proceeds to S16 in case of YES at S12. When the power supply current estimation unit 51 makes the determination at S12, the power supply current estimation unit 51 notifies the fault determination unit 55 of the regenerative current excess flag Flg1 in case of YES at S12. This process is indicated by a broken line as S13.

As shown in FIG. 5, the regenerative current excess flag Flg1 is OFF before the time tx, and is ON after the time tx. At the time tx, the overcurrent fault determination shifts from the permitted state to the stop state.

At S22, the fault determination unit 55 determines whether the absolute value |I #| of the phase current is greater than the current determination threshold value Ith. The symbol "#" represents any of "u, v, w". When it is determined to be YES at S22, the measure against the fault such as stop of the drive of the inverter 60 or interruption of the power supply relay 12 are performed at S23. When it is determined to be NO at S22, the processing is terminated.

As described above, in the first embodiment, when the value of the power supply current Ib generated by the regenerative energy is smaller than the negative power supply current threshold value (−X), the overcurrent fault determination is stopped. When the power supply voltage Vb is low and the increase in input voltage when regenerative energy is generated is small, erroneous determination of the overcurrent fault can be avoided.

Second Embodiment

Figure 6:
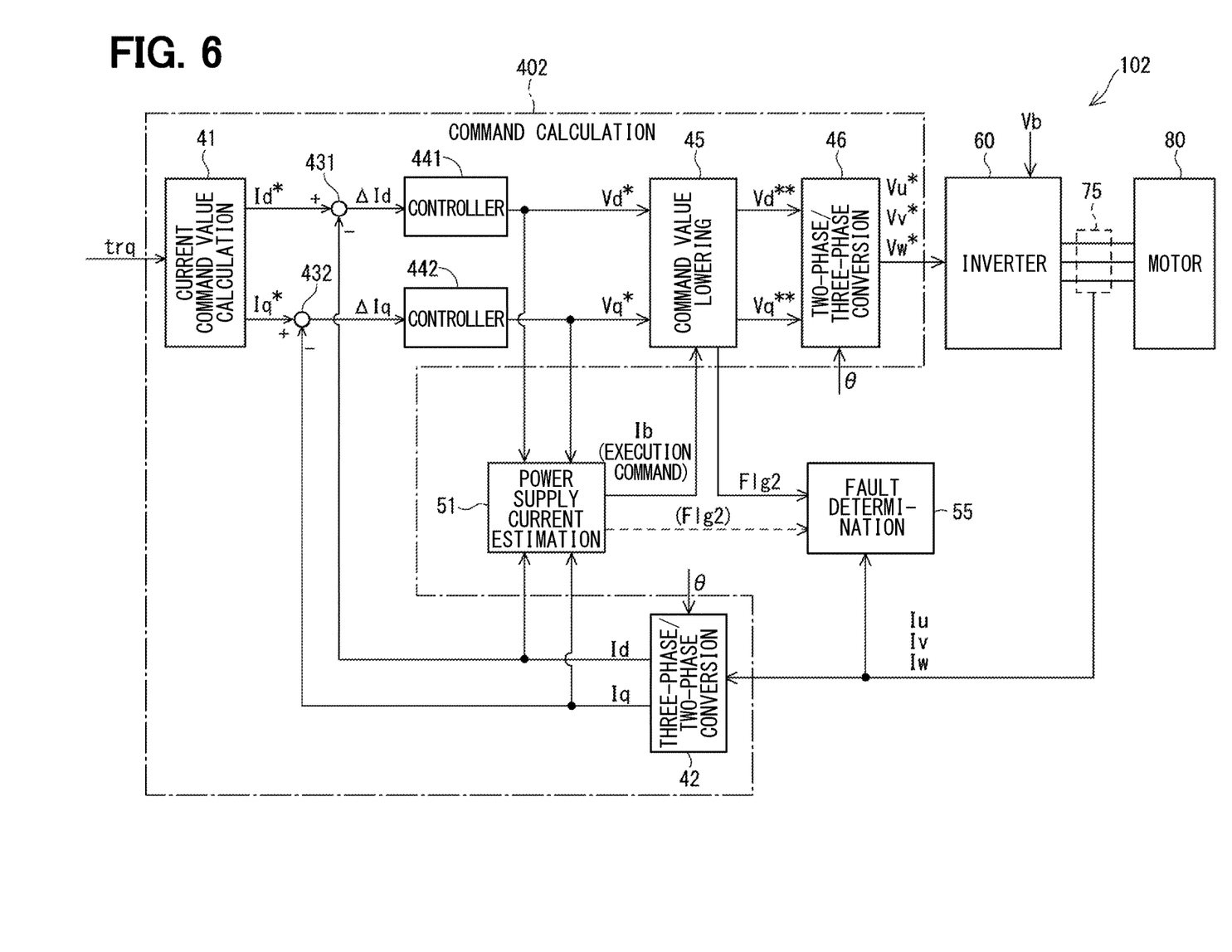
FIG. 6 is a block diagram for control according to the second embodiment.
Figure 7:
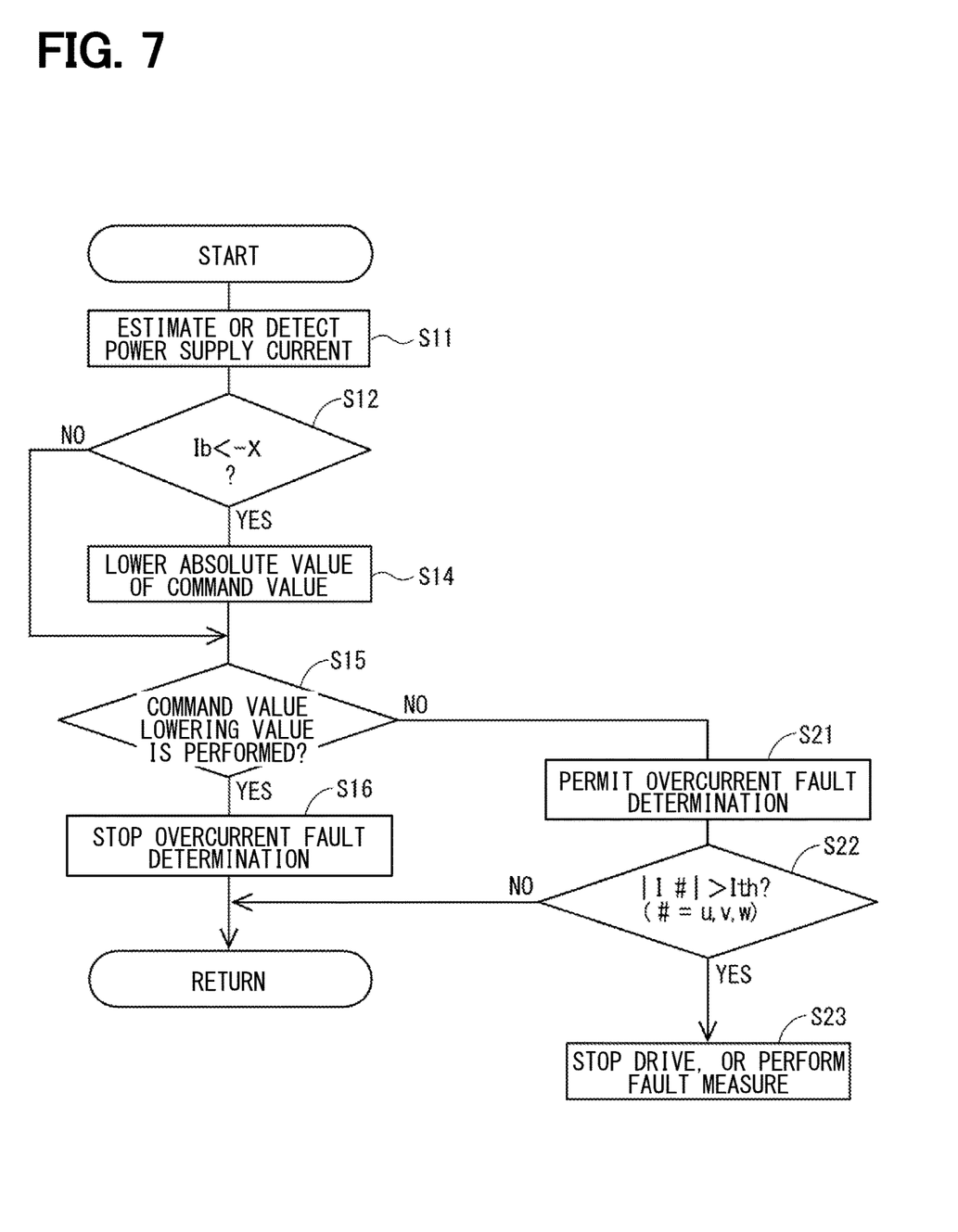
FIG. 7 is a flowchart showing overcurrent fault determination mask processing according to the second embodiment.

A motor control device 102 according to a second embodiment will be described with reference to FIGS. 6 to 8. The overall configuration of the motor control device conforms to FIG. 2 of the first embodiment, and the reference symbols "motor control device" and "command operation unit" are replaced with "102" and "402", respectively. As shown in FIG. 6, in the motor control device 102 of the second embodiment, the command calculation unit 402 includes a command value lowering unit 45 in addition to the configuration of the first embodiment.

The command value lowering unit 45 executes a "command value lowering process" that lowers the absolute values of the voltage command values Vd* and Vq* when a predetermined condition is satisfied, and outputs the processed voltage command values Vd, Vq to the two-phase/three-phase conversion unit 46. For example, the command value lowering unit 45 executes the command value lowering process by multiplying the voltage command values Vd*, Vq* by the suppression gain calculated from the ratio of the absolute value |Ib| of the power supply current and a target value. This calculation method is disclosed in U.S. Pat. No. 9,548,688 B2 (corresponding to JP 6428248 B2). U.S. Pat. No. 9,548,688 B2 is incorporated by reference.

In the second embodiment, "the value of the negative power supply current Ib estimated or detected by the power supply current estimation unit 51 is smaller than the negative power supply current threshold value (−X)" is a condition for executing the command value lowering process. When the command value lowering process is executed, the fault determination unit 55 stops the overcurrent fault determination.

That is, in the first embodiment, when "Ib<−X" is satisfied, the overcurrent fault determination is directly stopped, whereas in the second embodiment, when "Ib<−X" is satisfied, the overcurrent fault determination is indirectly stopped through the execution of the command value lowering process. In one exemplary configuration for realizing this operation, the power supply current estimation unit 51 notifies the command value lowering unit 45 of the power supply current Ib, and the command value lowering unit 45 compares the value of the power supply current Ib with the power supply current threshold value (−X). When "Ib<−X" is satisfied, the command value lowering unit 45 executes the command value lowering process and outputs a command value lowering flag Flg2 to the fault determination unit 55.

In another exemplary configuration, as shown in parentheses and a broken line of FIG. 6, when the power supply current estimation unit 51 determines that "Ib<−X" is satisfied, the power supply current estimation unit 51 outputs an execution command of the command value lowering process to the command value lowering unit 45 and outputs the command value lowering flag Flg2 to the fault determination unit 55.

A specific example of the overcurrent fault determination mask processing according to the second embodiment will be described with reference to the flowchart of FIG. 7 and the time chart of FIG. 8. Since the processes of S11, S12, S16, and S21 to S23 of FIG. 7 are substantially the same as those of FIG. 4 of the first embodiment, duplicate description will be omitted. In the second embodiment, in the case of YES at S12, the command value lowering unit 45 lowers the absolute values of the voltage command values Vd*, Vq* at S14. In the case of NO at S12, S14 is skipped.

At S15, it is determined whether the command value lowering process is performed, for example, the fault determination unit 55 is notified of the command value lowering flag Flg2. In this case, it may be determined that the fault determination unit 55 receives the command value lowering flag Flg2, or the power supply current estimation unit 51 or the command value lowering unit 45 transmits the command value lowering flag Flg2. Alternatively, it may be determined that the command value lowering process is executed by monitoring a change in the voltage command values Vd*, Vq* without using the flag. In the case of YES at S15, the fault determination unit 55 stops the overcurrent fault determination at S16. In the case of NO at S15, the fault determination unit 55 permits the overcurrent fault determination at S21.

Figure 8:
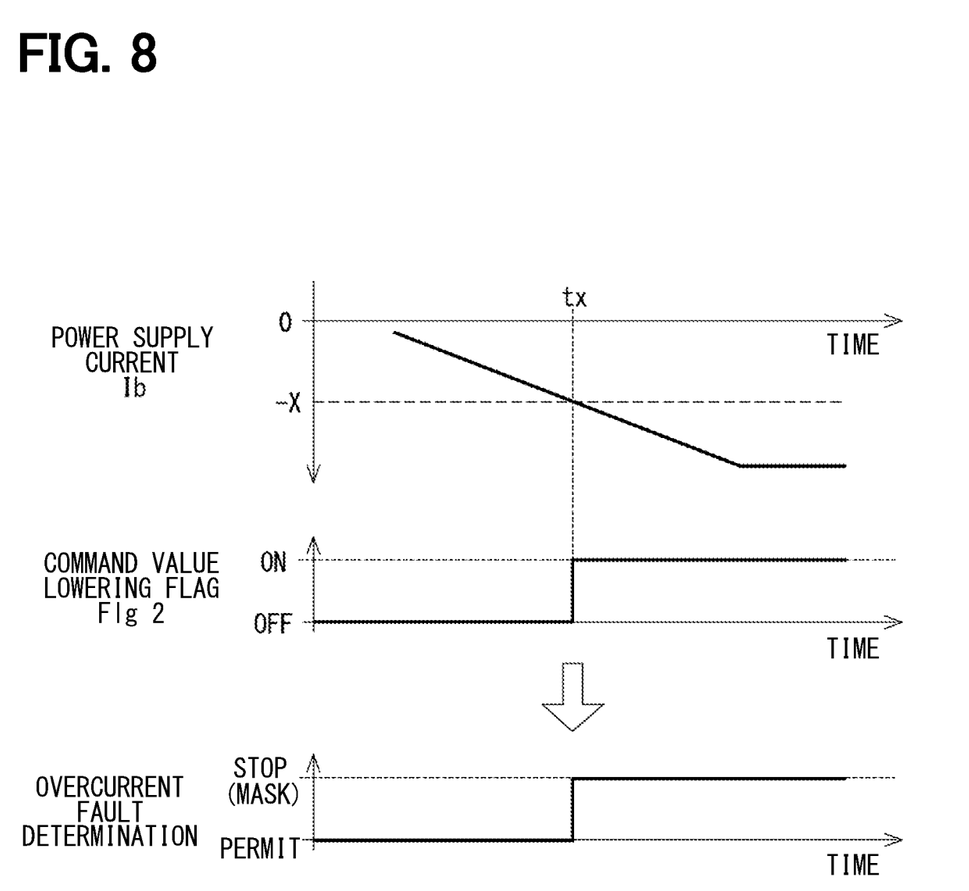
FIG. 8 is a time chart showing the overcurrent fault determination mask processing according to the second embodiment.

In FIG. 8, since the value of the power supply current Ib is equal to or greater than the threshold value (−X) before the time tx, the command value lowering flag Flg2 is OFF. Since the value of the power supply current Ib is smaller than the threshold value (−X) after the time tx, the command value lowering flag Flg2 is ON. At the time tx, the overcurrent fault determination shifts from the permitted state to the stop state.

As described above, in the second embodiment, when the value of the power supply current Ib is smaller than the negative power supply current threshold value (−X), the regenerative current is determined to be excessive. In this case, the absolute values of the voltage command values Vd* and Vq* are lowered for avoiding the overvoltage, and the overcurrent fault determination is stopped. Therefore, it is possible to more reliably avoid the erroneous determination of the overcurrent fault under the condition that the overcurrent fault is unlikely to occur.

Third Embodiment

Figure 9:
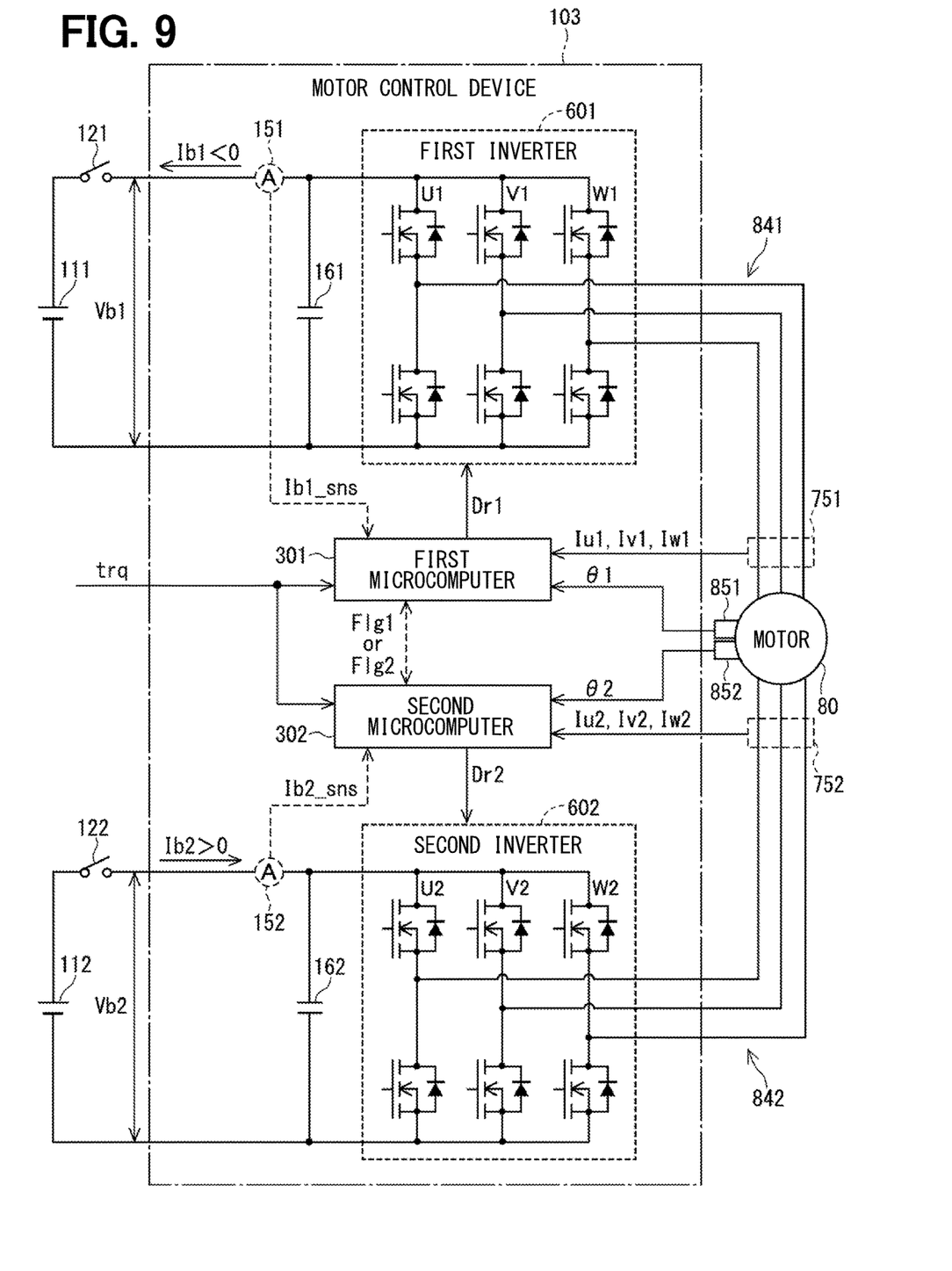
FIG. 9 is an overall configuration diagram showing a dual-system motor control device according to a third embodiment.

A motor control device 103 according to a third embodiment will be described with reference to FIGS. 9 and 10. When a plurality of systems is applied for a motor having a plurality of sets of motor windings, a unit of a group of elements related to electrical conduction to each motor winding is defined as a "system". The motor control device 103 includes two inverters 601, 602, and the two inverters 601, 602 energize the corresponding two sets of motor windings 841, 842. In FIG. 9, the symbols of the switching elements in the inverters 601 and 602 are omitted.

The first inverter 601 of the first system is supplied with DC power from a battery 111 of a power supply voltage Vb1, and the second inverter 602 of the second system is supplied with DC power from a battery 112 of a power supply voltage Vb2. Power relays 121, 122 are respectively provided between the battery 111 and the inverter 601 and between the battery 112 and the inverter 602. Smoothing capacitors 161, 162 are respectively provided at an input part of the inverter 601 and the inverter 602. The power supply current of the first system is referred to as Ib1, and the power supply current of the second system is referred to as Ib2. As shown by a broken line similarly to FIG. 2, power supply current sensors 151, 152 that respectively detect the power supply current Ib1 and the power supply current Ib2 may be provided.

Each of a first microcomputer 301 and a second microcomputer 302 has the similar configuration as the microcomputer 30 of FIG. 2. The first microcomputer 301 acquires phase currents Iu1, Iv1, Iw1 of the first system from the current sensor 751, and an electrical angle θ1 from the rotation angle sensor 851. The first microcomputer 301 calculates a drive signal Dr1 according to a steering torque trq based on the feedback information. The first inverter 601 energizes a U1 phase, a V1 phase, and a W1 phase of the motor winding 841 according to the drive signal Dr1.

The second microcomputer 302 acquires phase currents Iu2, Iv2, Iw2 of the second system from the current sensor 752, and an electrical angle θ2 from the rotation angle sensor 852. The second microcomputer 302 calculates a drive signal Dr2 according to the steering torque trq based on the feedback information. The second inverter 602 energizes a U2 phase, a V2 phase, and a W2 phase of the motor winding 842 according to the drive signal Dr2.

In a configuration in which the steering torque sensor is redundantly provided, the steering torques trq1 and trq2 may be input for each system. The microcomputers 301, 302 of each system are capable of mutually transmitting and receiving information by inter-computer communication between the microcomputers.

Figure 10:
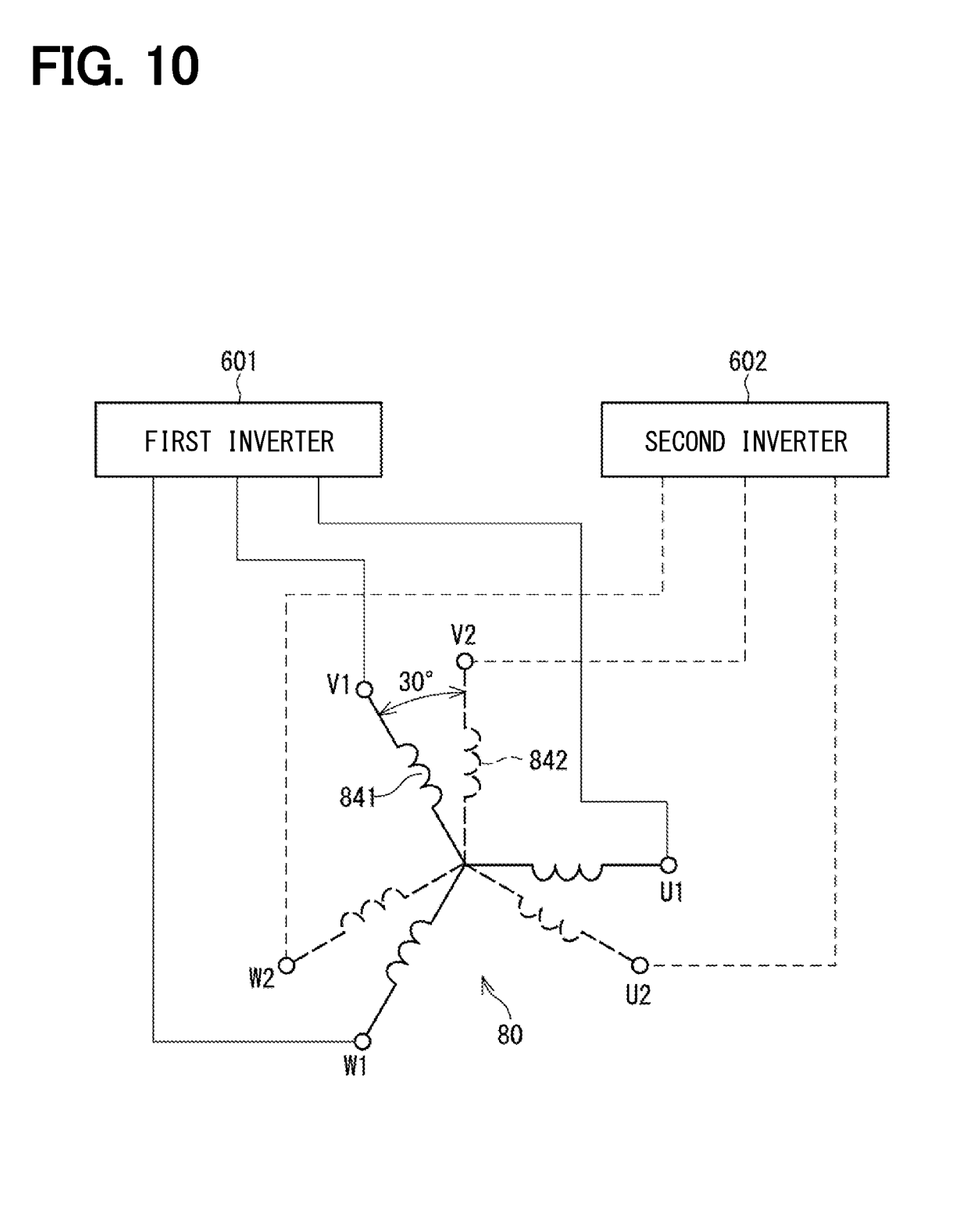
FIG. 10 is a schematic diagram showing a configuration of a double winding motor.

As shown in FIG. 10, the motor 80 is provided as a double winding motor in which two sets of motor windings 841, 842 are coaxially provided. The two sets of motor windings 841, 842 have the similar electrical characteristics and are located on a common stator while being shifted from each other by an electrical angle of 30 degrees. For this reason, the phase currents supplied to the winding sets 841, 842 are controlled to have a same amplitude and a phase difference of 30 degrees.

In such a dual-system configuration, the external force may be reversely input to the output shaft of the motor 80, the steering wheel 91 may be operated in a no-load state in which the wheels 98 are jacked up, and the difference in the output of each system may cause one perform a powering operation and the other perform a regenerative operation. That is, energy is transferred from the inverter with a great output to the inverter with a small output via the motor output shaft. For example, it is assumed that when the second system performs the powering operation and the first system performs the regenerative operation, the power supply voltage Vb1 of the first system is low and the negative value of the power supply current Ib1 is smaller than the power supply current threshold value (−X).

At this time, the first microcomputer 301 stops the overcurrent fault determination. On the other hand, the second microcomputer 302 need not to stop the overcurrent fault determination. However, in order to coordinate the control in the two systems, it is preferable that the second microcomputer 302 also stops the overcurrent fault determination in accordance with the first microcomputer 301. In the third embodiment, information that is a condition for stopping the overcurrent fault determination in any of the systems is communicated to other systems by the flag.

Specifically, the "information that the value of the power supply current Ib is determined to be smaller than the negative power supply current threshold value (−X)"

according to the first embodiment is communicated by the regenerative current excess flag Flg1. The "information that the command value lowering process is executed" according to the second embodiment is communicated by the command value lowering flag Flg2. As a result, the amount of communication information can be minimized and the communication load can be suppressed.

Note that, the case where one system performs the powering operation and the other system performs the regenerative operation due to the output difference of the two systems has been described, but similar operational effects can be obtained even when the regenerative energy is generated in both systems by a reverse input of the external force. Further, the technique of the third embodiment is not limited to two systems, but can be similarly extended to a plurality of systems of motor control devices of three or more systems.

Other Embodiments (a) In the above embodiment, when the power supply current Ib falls below the negative power supply current threshold value (−X), the overcurrent fault determination is immediately stopped or the command value lowering processing is performed. However, in order to avoid erroneous determination due to noise or the like, the processing may proceed to the next process when the same state continues for a predetermined time.

(b) In the third embodiment, information that is a condition for stopping the overcurrent fault determination in any of the systems is communicated to other systems by a signal other than the flag. For example, the value or converted value of the power supply current Ib may be communicated to another system.

(c) In the above embodiment, the sign of the value of the power supply current Ib is defined that "the direction supplied from the battery 11 to the inverter 60 is positive and the direction regenerated from the inverter 60 to the battery 11 is negative". Since it is simply a matter of definition, there is no essential difference even if it is defined that "the direction supplied from the battery 11 to the inverter 60 is negative and the direction regenerated from the inverter 60 to the battery 11 is positive". In other words, it indicates that the "current (−Ib) in the opposite direction to the power supply current defined in the above embodiment" is defined as the "power supply current (−Ib)". Therefore, a technique in which the definitions of the symbols are simply replaced with respect to the above embodiment is naturally included in the technical scope of the present disclosure.

(d) The motor control device of the present disclosure is not limited to a three-phase motor, and can be similarly applied to a multi-phase motor having four or more phases. Further, the present disclosure is not limited to the steering assist motor of the electric power steering device, and can be applied to any motor in which a negative power supply current may flow.

The present disclosure should not be limited to the embodiments described above, and various other embodiments may be implemented without departing from the scope of the present invention.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. Further, the computer program may store a computer-readable non-transitional tangible recording medium as an instruction to be executed by the computer.

What is claimed is:

1. A motor control device comprising:
at least one power converter connected between a DC power supply and a motor, and configured to convert a DC electric power into a multi-phase AC electric power by operating a plurality of switching elements and supply the multi-phase AC electric power to the motor; and
a processor configured to
calculate a command value for operating the at least one power converter to control electrical conduction to the motor,
determine an overcurrent fault when a value of a current flowing through the at least one power converter or a motor winding of the motor exceeds an overcurrent threshold value, and
estimate or detect a power supply current that is a direct current flowing between the DC power supply and the at least one power converter, wherein a value of the power supply current supplied from the DC power supply to the at least one power converter is defined by a positive value, and a value of the power supply current regenerated from the at least one power converter to the DC power supply is defined by a negative value, wherein
when the negative value of the power supply current is smaller than a power supply current threshold value as a negative value, the processor stops determination of the overcurrent fault.

2. The motor control device according to claim 1, wherein the motor includes a plurality of units of motor windings,
the plurality of units respectively correspond to a plurality of systems each including components related to the electrical conduction by the at least one power converter to the unit,
the plurality of systems are configured to communicate with each other, and
when one of the plurality of systems determines that the value of the power supply current of the one of the plurality of systems is smaller than the power supply current threshold value that is negative, the one of the plurality of systems transmits, by a flag, information that the value of the power supply current of the one of the plurality of systems is smaller than the power supply current threshold value that is negative to a remainder of the plurality of systems.

3. The motor control device according to claim 2, wherein the components include the motor control device and the DC power supply.

4. A motor control device comprising:
at least one power converter connected between a DC power supply and a motor, and configured to convert a DC electric power into a multi-phase AC electric power by operating a plurality of switching elements and supply the multi-phase AC electric power to the motor; and
a processor configured to, calculate a command value for operating the at least one power converter to control electrical conduction to the motor, determine an overcurrent fault when a value of a current flowing through the at least one power converter or a motor winding of the motor exceeds an overcurrent threshold value, and estimate or detect a power supply current that is a direct current flowing between the DC power supply and the at least one power converter, wherein a value of the power supply current supplied from the DC power supply to the at least one power converter is defined by a positive value, and a value of the power supply current regenerated from the at least one power converter to the DC power supply is defined by a negative value, wherein when the value of the power supply current is smaller than a power supply current threshold value as a negative value, the processor performs a command value lowering process that lowers an absolute value of the command value, and when the command value lowering process is performed, the processor stops determination of the overcurrent fault.

5. The motor control device according to claim 4, wherein the motor includes a plurality of units of motor windings, the plurality of units respectively correspond to a plurality of systems each including components related to the electrical conduction by the at least one power converter to the unit, the plurality of systems are configured to communicate with each other, and when one of the plurality of systems determines that the command value lowering process in the one of the plurality of systems is performed, the one of the plurality of systems transmits, by a flag, information that one of the plurality of systems determines that the command value lowering process in the one of the plurality of systems is performed to a remainder of the plurality of systems.

6. The motor control device according to claim 5, wherein the components include the motor control device and the DC power supply.

* * * * *